United States Patent [19]

Cole

[11] Patent Number: 4,958,843
[45] Date of Patent: Sep. 25, 1990

[54] MULTI-PURPOSE SPEED-AWAY TOY COASTER VEHICLE AND METHOD THEREFOR

[76] Inventor: Millard S. Cole, 1333 Linden Rd., Prescott, Ariz. 86301

[21] Appl. No.: 473,820

[22] Filed: Feb. 2, 1990

[51] Int. Cl.⁵ .............................................. B62B 3/02
[52] U.S. Cl. .................................. 280/30; 280/47.35; 280/87.043
[58] Field of Search .................... 280/30, 47.34, 47.35, 280/47.38, 79.2, 87.01, 87.021, 658, 7.1, 87.043; 287/243, 250

[56] References Cited

U.S. PATENT DOCUMENTS

| | | | |
|---|---|---|---|
| 1,175,312 | 3/1916 | Simpson | 280/47.34 |
| 1,388,756 | 8/1921 | Peters | 280/47.35 |
| 1,554,240 | 9/1925 | Strauss | 280/87.021 |
| 1,563,401 | 12/1925 | Rousseau | 280/87.021 |
| 1,609,536 | 12/1926 | Carlson | 280/87.021 |
| 1,662,292 | 3/1928 | Bender | 280/7.1 |
| 1,711,418 | 4/1929 | Linden | 280/87.043 |
| 1,747,227 | 2/1930 | Daniel | 280/87.043 |
| 1,773,567 | 8/1930 | Bradley | 280/87.043 |
| 1,806,749 | 5/1931 | Ellis | 280/87.01 |
| 1,806,961 | 5/1931 | Waas | 280/87.043 |
| 1,893,193 | 1/1933 | Blackmore | 280/87.021 |
| 2,426,432 | 8/1947 | Breckner et al. | 280/47.35 X |
| 2,461,577 | 2/1949 | Stark, Jr. | 280/30 X |
| 2,470,061 | 5/1949 | Wheeler | 280/87.01 |
| 2,681,098 | 6/1954 | Bijold | 297/243 X |
| 2,797,102 | 6/1957 | Adams | 280/30 |
| 4,222,582 | 9/1980 | Tonelli et al. | 280/87.021 |
| 4,878,680 | 11/1989 | Molnar | 280/30 |

OTHER PUBLICATIONS

Commerce People, "Child Care Center Raises Tuition Rates This Month", Oct. 1989, p. 9.

Primary Examiner—Charles A. Marmor
Assistant Examiner—Brian L. Johnson
Attorney, Agent, or Firm—Harry M. Weiss

[57] ABSTRACT

A toy vehicle for use by one, two, three or four children in various physical configurations that result in essentially different toys. The invention achieves multipurpose functionality with only one basic vehicle structure. The result is obtained by providing a basic cart structure with interchangeable accessories that can be mounted on the cart to obtain different and mutually exclusive toys. The invention can be used and enjoyed by a different number of children at the same time, without limiting its usefulness to any predetermined and fixed number of players.

1 Claim, 2 Drawing Sheets

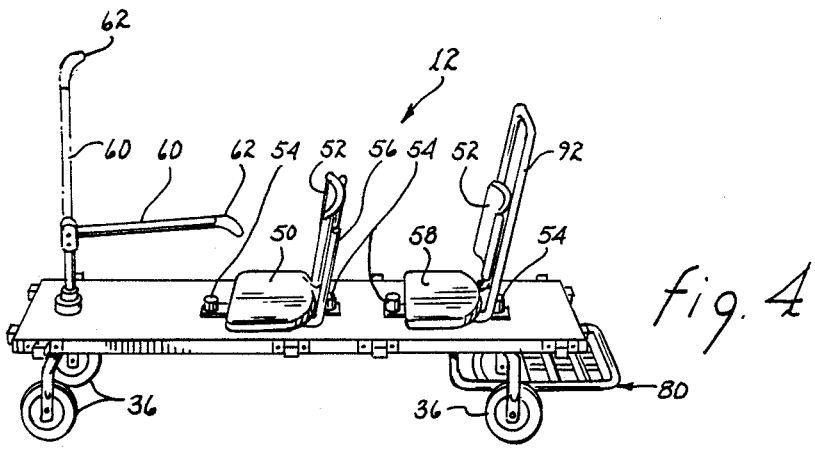
fig. 4
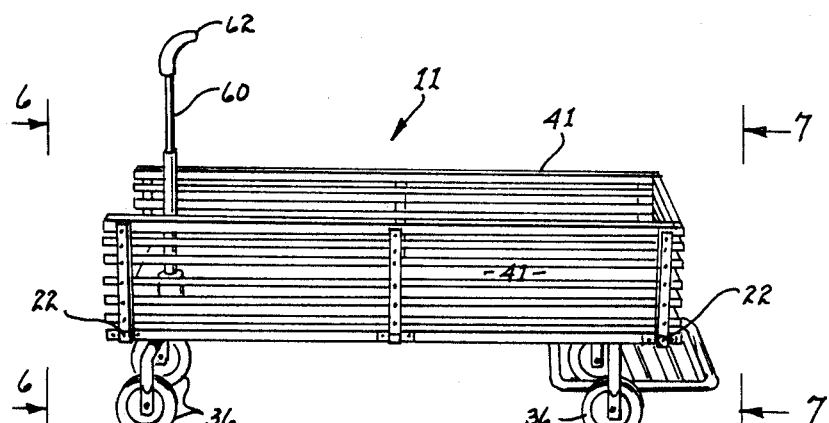
fig. 5
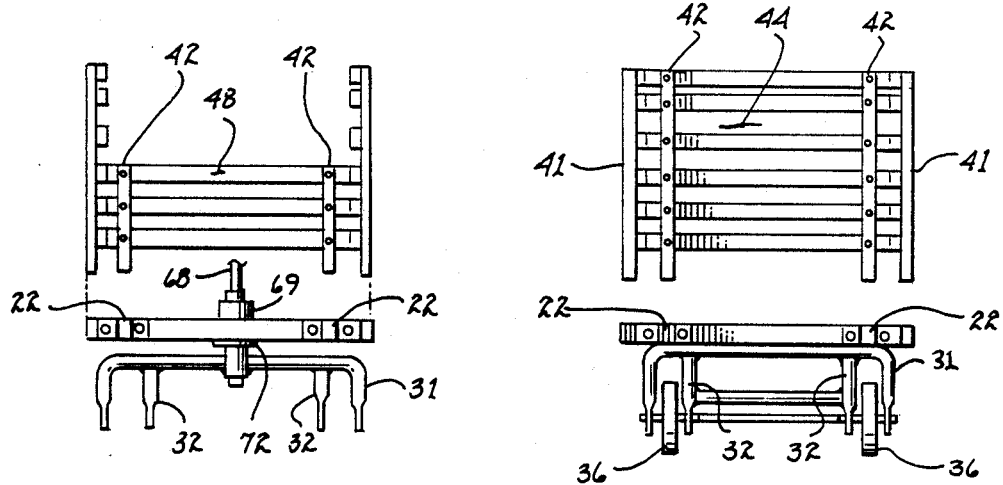
fig. 6
fig. 7

MULTI-PURPOSE SPEED-AWAY TOY COASTER VEHICLE AND METHOD THEREFOR

BACKGROUND OF THE INVENTION

1. Field of the Invention

This invention pertains to the general field of toy carts and coasters and methods therefor for children and in particular, to a new and improved four-wheeled toy vehicle and method therefor that can be transformed into a number of different configurations for different uses by up to four children at the same time.

2. Description of the Prior Art

Toy carts have been manufactured for children's pleasure since time immemorial. They basically consist of steered vehicles upon which children can ride, either by coasting downhill or by pushing forward against the ground. They also comprise load carrying wagons that the children can pull along and steer by controlling a handle capable of pivoting the front wheels axle. Inventions over the years have dealt with improvements to the various parts and their functions in such vehicles.

For example, Carlson, U.S. Pat. No. 1,609,536 describes an improvement in the steering mechanism that permits greater maneuverability by a child riding in a coaster cart. By achieving a full 90 degree turning capability of the front wheels from the passenger position in the cart, the subject invention enables the child to control the direction of the cart without the steering handle limitations found in prior models.

Bender, U.S. Pat. No. 1,662,292, discloses a vehicle adapted for conversion into either a walker, a go-cart, or a coaster. The basic cart frame is improved to be able to interchangeably receive alternative parts to perform different functions, as desired. In each case, the resulting vehicle accommodates one riding passenger.

Linden, U.S. Pat. No. 1,711,418, describes a steering mechanism that is operated from the back by a child standing on the vehicle with one foot and using the other for pushing on the ground. Therefore, a second child or any desired load can be carried in the cart while it is being propelled and controlled from the back by the first child. Essentially the same result is achieved by Daniel, U.S. Pat. No. 1,747,227 through the use of a novel and safer mechanism for steering the front axle from the back of the vehicle.

Bradley, U.S. Pat. No. 1,773,567, Bradley devises a dual purpose steering mechanism that permits either a passenger child riding in front or a propelling child standing on a step in the back of the vehicle to control the direction of motion. This disclosure combines the functional features of several prior inventions by virtue of a novel steering device.

Ellis, U.S. Pat. No. 1,806,749 describes a toy coaster designed to be used in substantially the same way as a snow sled. Thus, it incorporates the same structural characteristics of a sled, including friction brakes and a steering device that operates on wheels instead of runners.

Finally, Wheeler, U.S. Pat. No. 2,470,061, discloses a toy vehicle designed to approximate the appearance of a real automobile. It includes improvements over all prior toy cart models in its steering, suspensions, bumpers and general body construction.

The author of the present invention is motivated by the limited use that can be made of the kind of carts described in the prior art. Therefore, it is the object of this invention to provide a multipurpose toy vehicle and method therefor that can perform different functions according to the needs and desires of the children playing with it. Accordingly, the new toy describes a variety of interchangeable parts that can be promptly and easily assembled to provide the appropriate toy for the occasion, for one, two three or even four children's play.

BRIEF SUMMARY OF THE INVENTION

This invention consists of a toy vehicle for use by one, two, three or four children in various physical configurations that result in essentially different toys. An object of the present invention is to provide a multipurpose toy vehicle and method therefor in one basic vehicle structure. This object is obtained by providing a basic cart structure with interchangeable accessories that can be mounted on the cart to obtain different and mutually exclusive toys.

Another object of the present invention is to provide a multipurpose toy vehicle and method therefor that can be used and enjoyed by any number of children at the same time, without limiting its usefulness to any predetermined and fixed number of players. This object is obtained by providing physical configurations that can be operated by one, two, three, or even four children, each having a different role in the game.

A further object of the present invention is to provide a multipurpose toy vehicle and method therefor that is commercially viable. This object is obtained by utilizing components that are already developed and available in the open market at a variety of prices to suit the different quality needs of customers at large. Various other purposes and advantages of this invention will become clear from its description in the specifications that follow, and from the novel features particularly pointed out in the appended claims.

Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 4 is a perspective view of another configuration of the present invention representing a two seat cart with a rear riding platform.

FIG. 5 is perspective view of yet another configuration of the present invention representing a wagon with a rear riding platform.

FIG. 6 is an exploded view of front portions of the present invention taken along line 6—6 in FIG. 5.

FIG. 7 is an exploded view of back portions of the present invention taken along line 7—7 in FIG. 5.

DETAILED DESCRIPTION OF THE INVENTION

The heart of this invention lies in the multiple uses that it can provide with simple structural modifications to a basic frame that can be performed quickly and simply even by a child. The invention consists of a basic cart structure upon which the user builds to assemble the desired toy vehicle.

Figure 1:
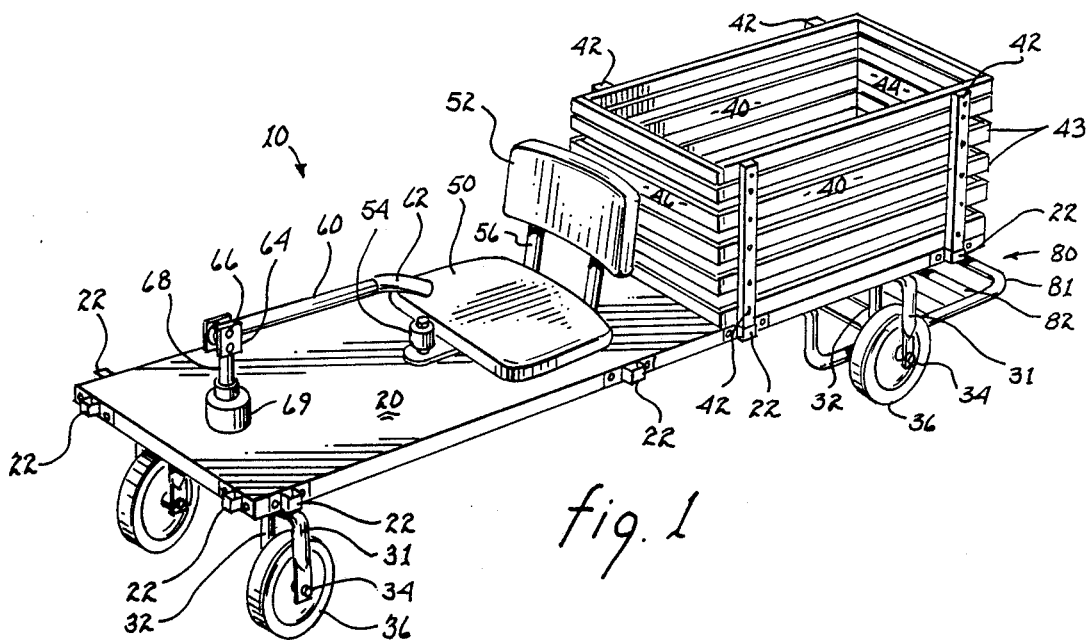
FIG. 1 is a perspective view of one configuration of the present invention representing a single seat cart with a rear wagon section and a back riding platform.
Figure 2:
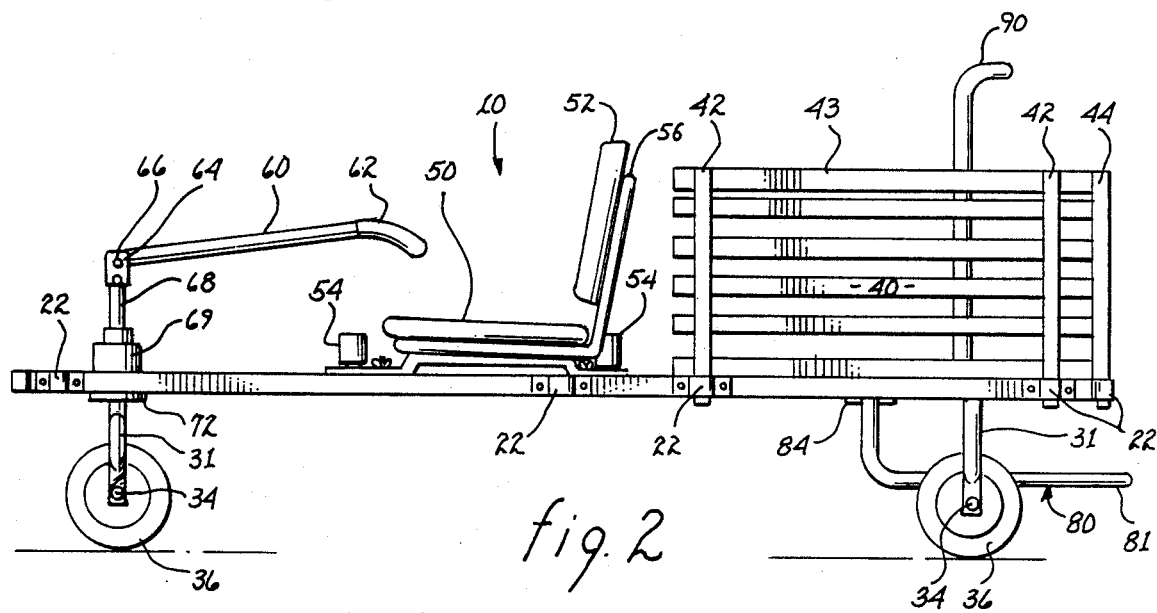
FIG. 2 is a side view of the present invention in FIG. 1.
Figure 3:
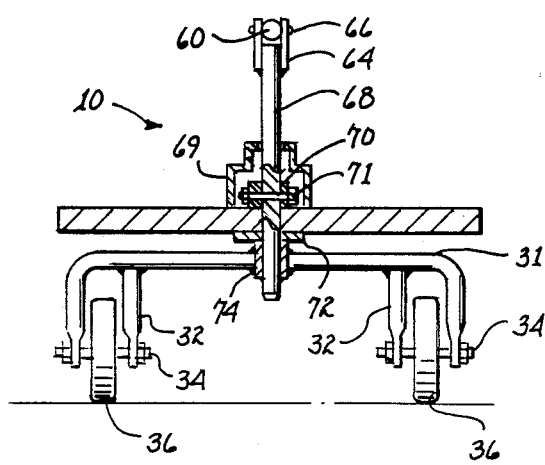
FIG. 3 is a front view of the present invention in FIG. 1.

Referring to FIGS. 1, 2 and 3, a particular embodiment of a toy vehicle 10 representing a single seat coaster is shown as comprising a deck or flat bed 20 approximately five feet long and 20 inches wide, of sufficient thickness to safely withstand the loads to which it might be subjected during normal riding and hauling by playful children. Preferably, the bed 20 can be constructed of hard wood or light sheet metal, or any other appropriate material to which the remaining structural members of the apparatus can be firmly anchored. Multiple brackets 22, also called stake pockets, are affixed to the sides and back of the bed 20 to receive and firmly hold in place vertical pegs or stakes 42. The stakes 42 are integrally attached to and form part of side rails 40 and 44. Similar side rails 41 and 48 are illustrated in FIGS. 5, 6 and 7 where the toy vehicle 10 is shown in a wagon configuration 11.

Preferably, the side rails 40,41,44 and 48 are all constructed with wood or metal staves 43 held together by the pegs 42, which are firmly attached to each stave 43 by rivets, screws or equivalent means to form rigid side rails for converting the flat bed 20 into a haulage box. In the toy vehicle 10 shown in FIG. 1, a front rail 46 is attached to the two side rails 40 to form a single, three-sided unit held in place by the pegs 42 inserted in the brackets 22 on the sides of bed 20. A rigid vertical handle bar 90, as shown in FIG. 2, can be bolted to the back of the bed 20 for use by a child riding on a rear platform 80, which is described in detail below.

A seat 50 with a back 52 attached to a seat frame 56 is secured to the cart bed 20 by two bolts 54. The bolt heads are preferably coated with rubber or similar material to protect the children from exposure to sharp edges. In a two seat configuration 12 of the present invention, shown in FIG. 4, an additional seat 58 is similarly bolted to the bed 20 behind the front seat 50. A frame 92 of the seat 58 is extended upwards to provide a handle bar for anyone pushing the cart or riding it by standing on the platform 80 protruding from the underside of the back of the vehicle. The platform 80 consists of a frame 81 supporting closely spaced rungs 82 and fastened to the bottom of the bed 20 by bolts or welds on a flat flange 84. The frame 81 of the platform 80 is also fastened, preferably welded, to an axle bracket 32 of the rear wheels.

Referring to the steering system, a handle bar 60 with a handle 6 is provided to control the direction of motion either while riding the vehicle as a cart or while pulling it as a wagon. The handle bar 60 is pivotally attached to a steering assembly capable of transmitting turning motion to the front axle. By pivoting around a bolt 66, the handle bar 60 can assume any position from vertical to horizontal, as illustrated in FIG. 4. Looking at FIG. 3, the bolt 66 connects the handle bar 60 to two parallel plates 64 attached to a vertical pipe 68 that is firmly held in place through the vehicle's bed by a sleeve 70 secured around the pipe by a bolt 71. The pipe 68 in turn is tightly fastened to a receiving collar 74 located in the middle of the front wheels bracket 31. A friction plate 72 is provided to protect the bed 20 from damage caused by the rotation of the bracket 31. In addition, a cover 69 is provided for aesthetic and safety purposes.

As shown in all figures, all possible configurations of this toy vehicle include a front and a rear set of wheel axles of equal construction. Each set consists of an inverted-U shaped bracket 31 of tubular construction to which inside tubular members 32 are welded to form individual forks for receiving 8 to 10 inch roller bearing wheels 36 mounted on single axles 34. Each such axle consists of a rod placed through holes in the fork tip and secured in place by any kind of locking nut or other retainer. As explained above, the top center of the front bracket is connected to the steering system through the collar 74, while the rear bracket is affixed to the bottom of the bed 20. Alternatively, toy vehicle 10 can be mounted on skies or water paddles.

With respect to the practical uses and functioning of this invention, the single seat cart of FIG. 1 can be used as a coaster with one driver only, or with a driver and a passive rider standing on the platform. Alternatively, it can be pulled by a child to carry a load in the rear box, or pushed by a child standing on the platform while a driver steers the cart along.

Similarly, the two seat configuration of FIG. 4 can be ridden by three children at the same time, two sitting and one standing on the platform, either to coast downhill or to ride by pushing from the back. If desired, a fourth child could pull these three children by walking in front of the cart, thus having four children play with the toy at the same time. Similarly, the wagon configuration of FIGS. 5, 6 and 7 is susceptible to different uses by a varying number of children.

While only one of many ways to effect the same result, the apparatus shown in the figures is believed to be the best example for practicing this invention in a safe, economical, and operationally efficient way. Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparata and methods.

I claim:

1. A multi-configuration toy vehicle, comprising:
   a frame having a horizontal bed approximately five feet constructed of rigid and resilient material for withstanding loads during normal riding and hauling by playful children, said horizontal bed having multiple bracket means, along a perimeter thereof, for receiving and firmly holding in place attachments for said frame;
   an inverted U-shaped front wheel axis bracket having two legs an d being rotatably anchored to an underside of a front of said bed, each leg of said front bracket extending downward and bifurcating to form a fork capable of supporting an axle means and a roller bearing wheel;
   an inverted U-shaped rear wheel axle bracket having two legs and being rigidly anchored to an underside of a back of said bed, each leg of said rear bracket extending downward and bifurcating to form a fork capable of supporting an axle means and a roller bearing wheel;

a steering assembly comprising a handle bar to control the direction of motion of said toy vehicle, said handle bar being capable of assuming any position from horizontal to vertical by being pivotally attached to two parallel plates affixed to a vertical pipe that is firmly and rotatable held in place through said bed by a sleeve and that is tightly fastened to a receiving collar located in a middle of said front wheel axle bracket, a friction plate coupled to said steering assembly to protect said bed from potential damage caused by wear due to steering rotation of said front wheel axle bracket;

a horizontal platform attached to and protruding backward from the underside of said bed, said platform being provided fro standing while riding in hte back of said toy vehicle;

a front seat with a back for attachment to a top front portion of said bed;

a back seat with a back for attachment to a top rear portion of said bed, handle bar means comprising one of said back seat having a frame extending upward to form a handle bar for the rider on said platform in the back of said bed and a vertical handle bar means for attachment on a top rear portion of said bed to provide stability for a rider on said platform;

two side rails equal in length to the length of said bed, each of said side rails consisting of rigid horizontal staves equipped with and held together by vertical pegs for holding the side rail in place in said brackets along the sides of said bed;

one back rail equal in length to the width of said bed, said back rail consisting of rigid horizontal staves equipped with and held together by vertical pegs for holding the back rail in place in said brackets along the back of said bed.

* * * * *

UNITED STATES PATENT AND TRADEMARK OFFICE
CERTIFICATE OF CORRECTION

PATENT NO. : 4,958,843

DATED : September 25, 1990

INVENTOR(S) : Cole

It is certified that error appears in the above-identified patent and that said Letters Patent is hereby corrected as shown below:

In column 4, Claim 1, lines 52 and 53, please delete "approximately five feet".

In column 4, Claim 1, line 59, please change "axis" to --axle--.

In column 4, Claim 1, line 60, please change "an d" to --and--.

In column 5, Claim 1, line 20, please change "fro" to --for--.

In column 5, Claim 1, line 21, please change "hte" to --the--.

Signed and Sealed this

Tenth Day of December, 1991

Attest:

HARRY F. MANBECK, JR.

*Attesting Officer*  *Commissioner of Patents and Trademarks*